(12) United States Patent
Meeusen et al.

(10) Patent No.: US 10,704,567 B2
(45) Date of Patent: Jul. 7, 2020

(54) COMPRESSOR MODULE FOR COMPRESSING GAS AND COMPRESSOR EQUIPPED THEREWITH

(71) Applicant: ATLAS COPCO AIRPOWER, NAAMLOZE VENNOOTSCHAP, Wilrijk (BE)

(72) Inventors: Wim Meeusen, Wilrijk (BE); Thomas De Bontridder, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 67 days.

(21) Appl. No.: 15/907,326

(22) Filed: Feb. 28, 2018

(65) Prior Publication Data

US 2018/0258952 A1    Sep. 13, 2018

Related U.S. Application Data

(63) Continuation of application No. PCT/IB2017/052857, filed on May 15, 2017.

(30) Foreign Application Priority Data

Mar. 7, 2017    (BE) .................................. 2017/5140

(51) Int. Cl.
F04D 29/58    (2006.01)
F04D 29/063    (2006.01)
(Continued)

(52) U.S. Cl.
CPC .......... F04D 29/5833 (2013.01); F04B 39/06 (2013.01); F04B 53/08 (2013.01);
(Continued)

(58) Field of Classification Search
CPC ............... F04D 29/063; F04D 29/5806; F04D 29/5833; F04B 35/01; F04B 39/06;
(Continued)

(56) References Cited

U.S. PATENT DOCUMENTS 1,764,753 A    6/1930    Seagren
2,751,144 A    6/1956    Troendle
(Continued)

FOREIGN PATENT DOCUMENTS

DE    102013102879 A1    9/2014
EP    1138948 A2    10/2001
(Continued)

OTHER PUBLICATIONS

International Search Report dated Nov. 17, 2016 on PCT/IB2017/052857.
(Continued)

*Primary Examiner* — Igor Kershteyn
(74) *Attorney, Agent, or Firm* — Bacon & Thomas, PLLC

(57) ABSTRACT

A compressor module for compressing gas composed of a compressor element with a housing with integrated compressor element cooler; a motor and a gas cooler for cooling the compressed gas originating from the compressor element. The gas cooler includes a primary section through which the gas to be cooled can be guided and a secondary section that is in heat-exchanging contact with the primary section. A first cooling circuit can guide a coolant through the secondary section of the gas cooler or through a section thereof and a second cooling circuit can guide a coolant through the compressor element cooler. The first cooling circuit and the second cooling circuit are joined together in series or in parallel and are guided to a common output.

27 Claims, 5 Drawing Sheets

(51) Int. Cl.
*H02K 5/20* (2006.01)
*H02K 7/116* (2006.01)
*H02K 7/14* (2006.01)
*H02K 9/19* (2006.01)
*F04C 29/04* (2006.01)
*F04B 39/06* (2006.01)
*F04B 53/08* (2006.01)
*F04B 35/01* (2006.01)

(52) U.S. Cl.
CPC ............ *F04C 29/04* (2013.01); *F04D 29/063* (2013.01); *F04D 29/5806* (2013.01); *H02K 5/20* (2013.01); *H02K 7/116* (2013.01); *H02K 7/14* (2013.01); *H02K 9/19* (2013.01); *F04B 35/01* (2013.01)

(58) Field of Classification Search
CPC ........... F04B 53/08; F04C 29/04; H02K 5/20; H02K 7/14; H02K 7/116; H02K 9/19
See application file for complete search history.

(56) References Cited

U.S. PATENT DOCUMENTS

| | | | |
|---|---|---|---|
| 4,780,061 A | 10/1988 | Butterworth | |
| 5,507,618 A | 4/1996 | Kubo | |
| 6,301,923 B1* | 10/2001 | Bonaquist | F25B 7/00 |
| | | | 62/402 |
| 6,464,469 B1* | 10/2002 | Grob | F04D 17/12 |
| | | | 417/251 |
| 2001/0024617 A1* | 9/2001 | Ishigure | F04C 29/04 |
| | | | 417/372 |
| 2010/0303658 A1 | 12/2010 | Ito | |
| 2010/0307173 A1 | 12/2010 | Guo | |
| 2010/0326075 A1* | 12/2010 | Fong | F01K 25/06 |
| | | | 60/650 |
| 2011/0084561 A1* | 4/2011 | Swales | H02K 9/19 |
| | | | 310/54 |
| 2013/0156548 A1* | 6/2013 | Takano | F04C 29/04 |
| | | | 415/114 |
| 2015/0354553 A1* | 12/2015 | Nagura | F04B 39/06 |
| | | | 417/243 |
| 2017/0074258 A1* | 3/2017 | Amirouche | A61M 5/14224 |

FOREIGN PATENT DOCUMENTS

| | | |
|---|---|---|
| EP | 2610495 A1 | 7/2013 |
| EP | 2955375 A1 | 12/2015 |
| JP | H0365881 H | 6/1991 |
| JP | 2008163926 A | 7/2008 |
| KR | 101421497 B1 | 7/2014 |
| WO | 2015172206 A2 | 11/2015 |

OTHER PUBLICATIONS

Written Opinion of the ISA dated Nov. 17, 2016 on PCT/IB2017/052857.

Belgian Search Report dated 9Nov. 27 on BE201705140.

* cited by examiner

COMPRESSOR MODULE FOR COMPRESSING GAS AND COMPRESSOR EQUIPPED THEREWITH

The present invention relates to a compressor module and a compressor equipped therewith.

BACKGROUND OF THE INVENTION

Compressor modules are already known that consist of a compressor element; a motor for driving the compressor element; if applicable a gearbox between the compressor element and the motor; a gas cooler for cooling the compressed gas and a separate closed oil circuit with an oil sump, an oil cooler and an oil pump to drive the oil from the oil sump through the compressor module, via the oil cooler and an oil filter, for lubricating the bearings and if applicable the gears.

Generally the various components are assembled in the housing of a compressor, whereby the compressed gas is cooled by coolers through which a liquid coolant such as water is driven, or the compressed gas is cooled in radiators by means of fans that make the surrounding air flow through the housing for the cooling of these radiators.

The coolers and radiators are connected by means of flexible or fixed external pipes and connections to guide the coolant along or through the compressor module. These pipes and connections are not only expensive, but are also subject to defects and leaks that can lead to higher maintenance costs of such compressor modules.

A disadvantage of air cooling is that the ventilation air that removes the heat of compression is difficult to apply usefully. It is also difficult to cool to a low temperature with air cooling because to realise a small temperature difference, also called delta T, between the ventilation air temperature and the medium to be cooled, very large coolers are required that are very expensive. For example, in practice with direct or indirect air cooling, for example by means of an oil circuit with radiator, a compressor element generally remains relatively hot at its operating speed, which is to the detriment of the compression efficiency.

An additional disadvantage is that air cooling decreases over time as radiators accumulate dust and other dirt. For this reason radiators are generally overdimensioned to always be assured of sufficient cooling capacity, and radiators must be regularly cleaned, which means extra cost.

In a large number of compressors water is used as a coolant, primarily in large compressors. Water enables the heat of compression to be recovered from a compressor and this recovered heat to be used in a useful way, for example for heating buildings or generating electric power or similar.

For such heat recovery to be economical, it is necessary for a maximum of heat to be extracted from the compressor, not only from the compressed gas and from the compressor element itself, but also from other places such as the motor, if applicable the drive of the motor, the bearings, and any gearbox, and this either directly for example by water cooling of the motor, or indirectly for example by extracting the heat from the oil that is used for lubricating the bearings and gears.

The coolers of the motor and the compressor element are generally connected to external coolers by external pipes.

The oil circuit is also always provided with a separate external cooler connected via external pipes.

A disadvantage is that a large number of external pipes and connections are needed to guide the water and the oil around and that in this case too these pipes and connections drive up the cost price of the compressor, and also bring about an extra risk of defects and leaks.

SUMMARY OF THE INVENTION

The purpose of the present invention is to provide a solution to one or more of the aforementioned and other disadvantages.

To this end the invention concerns a compressor module for compressing gas that is composed of a compressor element with a housing with integrated compressor element cooler; a motor and a gas cooler for cooling the compressed gas originating from the compressor element with a primary section through which the gas to be cooled can be guided and a secondary section that is in heat-exchanging contact with the primary section; with a first cooling circuit that can guide a coolant through the secondary section of the gas cooler or through a section thereof and a second cooling circuit that can guide a coolant through the compressor element cooler and whereby the first cooling circuit and the second cooling circuit are joined together in series or in parallel and are guided to a common output.

Water can be used as a coolant, to which any additives are added, such as additives to inhibit corrosion for example. Instead of water, oil can also be used as a coolant.

The compressor module can comprise a gearbox with a housing between the compressor element and the motor.

The motor can comprise a housing with an integrated motor cooler. The second cooling circuit can guide coolant through the motor cooler in series or in parallel to the compressor element.

The second cooling circuit can guide coolant through a cooler on the motor drive in series or in parallel to the compressor element.

Preferably the compressor module comprises a closed oil circuit with an oil sump and an oil pump for driving the oil from the oil sump through or along the hot parts of the compressor module via internal channels, whereby the oil in the oil circuit is in heat-exchanging contact with the first cooling circuit and/or with the second cooling circuit via the aforementioned internal channels and/or the oil sump.

The oil pump can be driven by the motor that also drives the compressor element. Preferably a bypass to the oil sump is provided after the oil pump. An oil cooler can be provided in this bypass. This oil cooler can exchange heat with the first or second cooling circuit. Preferably an overpressure valve is provided in the bypass pipe, so that when the oil pump delivers a higher oil pressure than necessary, a proportion of the oil is guided to the oil sump via the bypass.

The oil pump can also be driven by a separate electric motor. Then using speed control, the flow and/or the pressure delivered by the oil pump can be controlled, in this way to always bring the desired quantity of oil for lubrication and cooling to the bearings and/or gears.

Preferably the oil in the oil circuit is in heat-exchanging contact with the second cooling circuit via internal channels of the motor and/or of the compressor element that is in heat-exchanging contact with the motor cooler and/or with the compressor element cooler.

Preferably the oil in the oil circuit is in heat-exchanging contact with the first cooling circuit via the secondary section of the gas cooler or a section thereof that is in heat-exchanging contact with the oil in the oil sump.

In a possible embodiment, the gas cooler extends through the oil sump by at least a sump section, whereby the primary section and/or the secondary section of the gas cooler in this sump section of the gas cooler is in heat-exchanging contact with the oil in the oil sump.

In a further possible embodiment the gas cooler extends outside the oil sump by at least an outer section, whereby the outer section of the primary section of this outer section is provided with a gas inlet to be able to guide the gas to be cooled successively through the outer section and the sump section.

The primary section of the gas cooler can be formed by a tube, whereby the secondary section of the gas cooler is integrated in or around this tube.

An advantage of such a compressor module in which the cooling is as good as fully integrated is that it is very easy to construct an operational compressor with such a compressor module.

After all it is sufficient to provide a gas filter on the gas inlet of the compressor element and to connect the output of the gas cooler, possibly via a pressure vessel, to a user network and to connect the first and second cooling circuit to a supply of coolant, and to provide a connection be able to usefully use the hot coolant of these cooling circuits, for example for heating or other forms of useful energy recovery.

Another advantage is that the heat is collected and removed directly from the hot parts of the compressor module where the heat is generated, such as in the bearings, the gears, the motor, the motor drive, the compressor element and similar, and that this heat can be recovered much more efficiently in this way due to the distance between the heat source and the cooler being much shorter, and less heat is thus lost due to radiation or other mechanisms.

The coolant is heated by the heat-exchanging contact with the heat of compression of the compressed gas in the gas cooler, by the heat that is generated in the motor, the motor drive and in the compressor element and by the heat-exchanging contact with the oil in the oil circuit, whereby this oil itself has absorbed the heat from bearings, gears and other moving parts that are lubricated with the oil.

As a result of this cumulative heat absorption the temperature of the coolant can be greatly increased, which is favourable for being able to use the hot coolant for heating or other applications, and this by making use of recovered heat that is generally lost with conventional compressors.

Another advantage is that due to the efficient removal of the heat of compression, the compressor element can be kept quite cool, which fosters the compression efficiency.

Another advantage is that no or fewer external pipes are required than with known compressors in order to guide the coolant and the oil through the compressor module, of course except for those for the connection of the module to a supply and outlet of the coolant, such that lower assembly costs, fewer leaks, less heat loss, for example by radiation and similar.

Another important advantage is that no extra external coolers or air cooling is required, or only to a limited extent, than those that are integrated in the compressor module. An advantage attached to this is that the compressor module can be confined in a closed housing of the compressor without extra ventilation, or with only limited ventilation, for example natural convection and/or forced ventilation, in order to drive surrounding air through the housing such as with known compressors, and thus without or with much less noise that such ventilation brings about.

This means that such a compressor according to the invention can be made low noise to a great extent due to the closed housing, that possibly can also be clad with low-noise material.

Another advantage is that a compressor module according to the invention can be made very compact, such that a smaller footprint is required.

Preferably the second cooling circuit is connected in parallel to the first cooling circuit or to a section of this first cooling circuit, whereby the second cooling circuit entirely or partially bypasses the first cooling circuit.

In a possible embodiment the first cooling circuit is provided with an input for the supply of coolant and the second cooling circuit is tapped off from the first cooling circuit at this input or at a point upstream from the secondary section of the gas cooler between this input and the secondary section of the gas cooler.

Preferably the two cooling circuits have a combined input and output.

In the second cooling circuit, orifices and/or valves can be incorporated to adjust and/or control how much coolant can flow through the cooling circuits.

In this way the heat that is absorbed from the motor and the compressor element by the coolant in the second cooling circuit is added to the heat that is recovered by the first cooling circuit from the hot compressed gas to thus obtain a higher temperature of the coolant, to above 90° C. for example at the combined output of both cooling circuits, such that this heat energy is also more usable for useful applications than heat energy at a lower temperature of 45° C. for example.

It is preferable that with an aforementioned parallel cooling circuit, the second cooling circuit connects to the first cooling circuit at an intermediary point of the secondary section of the gas cooler that is located between the input and the output of this secondary section.

In this way maximum use is made of the cold temperature of the coolant supplied in order to cool the compressed gas at the output of the primary section of the gas cooler efficiently.

In a possible embodiment, the second cooling circuit is connected to the first cooling circuit to bypass the secondary section in the sump section of the gas cooler.

A control valve and a closable connection for coolant can be provided at the location of the connection of the second cooling circuit to the aforementioned intermediary point of the secondary section of the gas cooler.

It is also possible that the first cooling circuit and the second cooling circuit are connected together in series with an input and an output to guide the coolant through both cooling circuits successively.

In a preferred embodiment the pipes of the second cooling circuit and the oil circuit are integrated in the housing of the compressor module.

In another preferred embodiment the pipes of the first cooling circuit are integrated in the housing of the compressor module.

At the output the coolant preferably reaches a temperature higher than 65° C., preferably higher than 75° C., and even more preferably higher than 85° C.

With one or more such compressor modules a compressor can be easily made, whereby these one or more compressor modules are affixed in a closed casing without forced ventilation with gas from outside.

This provides the advantage that no airflow is generated around the compressor, which can bring about dust nuisance and other problems, or otherwise requires additional ducting of the cooling air.

For the fluid connections the outer casing of such a compressor only requires an inlet and an outlet for gas that is compressed by the compressor element and a supply and outlet for the coolant that is driven through the cooling circuits.

The realisation of a compressor in such a way is particularly interesting for the realisation of an oil-free screw compressor.

Thanks to the modularity of the invention whereby each compressor module comprises its own efficient cooling, a multistage compressor can be put together in a simple way, whereby the compressor elements of two or more compressor modules are assembled in series.

In the particular case of a two stage compressor composed of two compressor modules according to the invention, i.e. a low pressure and a high pressure compressor module, the gas inlet of the high pressure compressor module is connected to the gas outlet of the low pressure compressor module, and it is preferable that the low pressure compressor module is a compressor module with the second cooling circuit in parallel to the first cooling circuit or a section of the first cooling circuit, and whereby consequently the second cooling circuit entirely or partially bypasses the first cooling circuit, and whereby the output of the second cooling circuit connects to an intermediary point of the secondary section of the gas cooler, and that the second cooling circuit of the high pressure compressor module connects to a pipe, if applicable provided with a control valve, on the first cooling circuit of the low pressure compressor module at the location or in the vicinity of this aforementioned intermediary point.

In this way the heat of the second cooling circuit of the high pressure compressor module is entirely or partially used to further heat the coolant that flows through the low pressure compressor module to a higher temperature that is more usable for heat recovery.

BRIEF DESCRIPTION OF THE DRAWINGS

With the intention of better showing the characteristics of the invention, a few preferred embodiments of a compressor module according to the invention and a compressor module equipped therewith are described hereinafter, by way of an example without any limiting nature, with reference to the accompanying drawings, wherein.

DETAILED DESCRIPTION OF THE INVENTION

Figure 1:
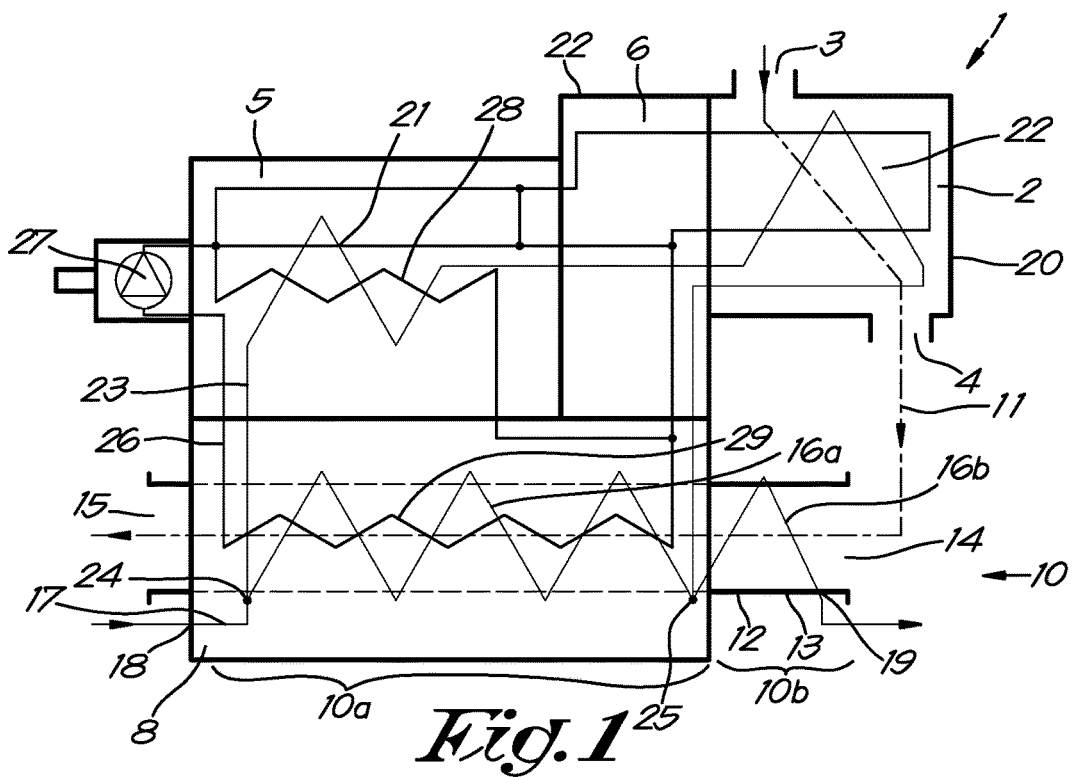
FIG. 1 schematically shows the construction of a compressor module according to the invention.
Figure 2:
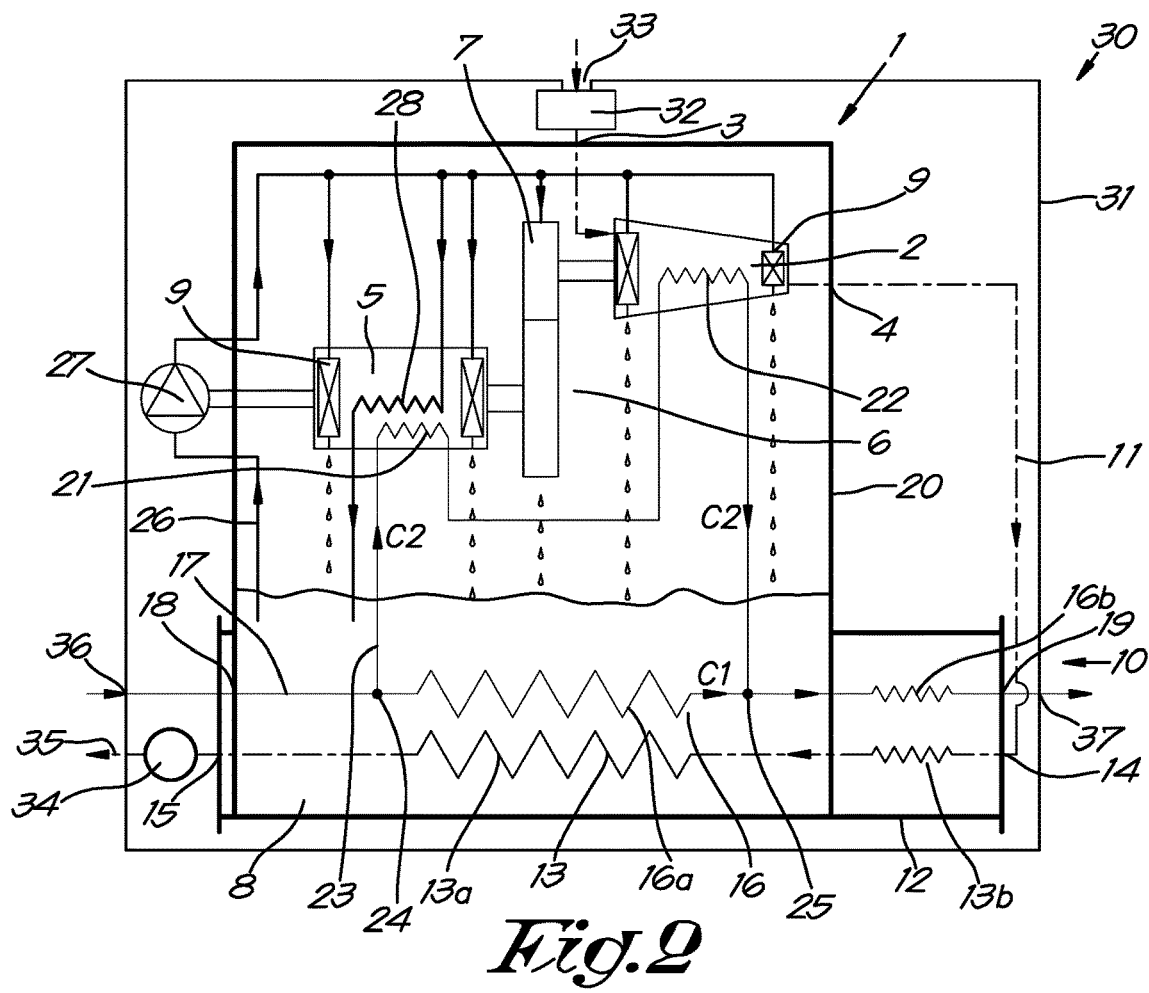
FIG. 2 schematically shows the flow diagram of the compressor module of FIG. 1 built into a housing of a single stage compressor.

The compressor module 1 shown in FIGS. 1 and 2 is composed of a compressor element 2 with an input 3 for gas to be compressed and an output 4 for the compressed gas; an electric motor 5; in this case a gearbox 6 between the compressor element 2 and the motor 5 with gears 7 for the transmission of the motor torque to the compressor element 2; an oil sump 8 with oil for lubricating and cooling the bearings 9 of the motor 5 and the compressor element 2 and of the gears 7; and a gas cooler 10 for cooling the compressed gas originating from the compressor element 2, whereby this gas cooler 10 is connected via a pipe 11, shown schematically, to the output 4 of the compressor element 2.

In this case the gas cooler 10 comprises a tube 12 that forms the primary section 13 of the gas cooler 10 through which the compressed gas originating from the compressor element 2 can be guided via a gas inlet 14 to a gas outlet 15, to which a network of users of compressed gas can be connected, whereby this tube 12 is in heat-exchanging contact with the secondary section 16 of the gas cooler 10 that extends as a first cooling circuit 17 in or around the tube 12, and which is provided with an input 18 and an output 19 for a coolant that is carried through it in the direction of the arrow C1.

Primary here means the part of the heat exchanger that the medium to be cooled flows through, in this case compressed gas, and secondary means the part of the heat exchanger that the coolant flows through.

The gas cooler 10 extends, by a sump section 10a, transversely through the oil sump 8 in heat-exchanging contact with the oil in the oil sump 8 and an outer section 10b outside the oil sump 8.

The primary section 13 of the gas cooler 10 is thus split into a sump section 13a in the sump section 10a of the gas cooler 10 and an outer section 13b in the outer section 10b of the gas cooler 10.

In the same way the secondary section 16 of the gas cooler 10 is split into a sump section 16a and an outer section 16b.

In the example discussed here, the first cooling circuit 17 is composed of the sump section 16a and the outer section 16b of the secondary section 16 of the gas cooler 10.

The housing 20 of the compressor module is composed of the housings of the compressor element 2; the motor 5; the gearbox 6; the gas cooler 10 and the oil sump 8.

A motor cooler 21 and a compressor element cooler 22 are integrated in the housing 20 of the compressor module, whereby this motor cooler 21 and compressor element cooler 22 are each formed by internal channels of the housing that wind around the rotor of the motor 5 and around the rotors of the compressor element 2 respectively for example, and through which a coolant can be driven.

In addition to the first cooling circuit 17, the compressor module 1 comprises a second cooling circuit 23 for a coolant that is driven in series first through the aforementioned motor cooler 21 and then through the compressor element cooler 22 in the direction of the arrows C2.

In the example of FIGS. 1 and 2, the second cooling circuit 23 is connected in parallel to a section of the first cooling circuit 17, more specifically to the section of the first cooling circuit that is formed by the sump section 16a of the secondary section 16 of the gas cooler 10 that is in heat-exchanging contact with the oil in the oil sump 8 and which in this way is bypassed by the second cooling circuit 23.

The second cooling circuit 23 is thereby tapped off from the first cooling circuit 17 at a point 24 at the input 18 of the first cooling circuit 17 and thereafter connects back to the first cooling circuit 17 at an intermediary point 25 of the secondary section 16 of the gas cooler 10 that is located between the input 18 and the output 19 of this secondary section 16, preferably at an intermediary point 25 in the vicinity of the transition between the sump section 10a and the outer section 10b of the cooler 10.

The compressor module 1 is further provided with a closed oil circuit 26 with an oil pump 27, which in this case is affixed on the motor 5 and is driven by it and which pumps oil around from the oil sump 8 through internal channels in the housing 20 of the compressor module 1 to the aforementioned bearings 9 of the motor 5 and of the compressor element 2, and to the gearbox 6 from which the oil flows back to the oil sump 8. The internal channels of the oil circuit 26 are thereby guided through the housing of the motor 5 and the housing of the compressor element 2 in heat-exchanging contact with the coolant of the second cooling circuit 23 that is guided through the motor cooler 21 and through the compressor element cooler 22, such that the oil circuit in the motor 5 and in the compressor element 2 acts as an oil cooler 28 that absorbs heat from the motor 5 and from the compressor element 2 during the operation of the compressor module and emits this heat to the coolant of the second cooling circuit 23 that itself also absorbs heat from the motor 5 and from the compressor element 2, and as a result its temperature increases greatly.

Because both the coolant and the oil absorb heat from the motor 5 and in the compressor element 2, the motor 5 and the compressor element 2 itself are kept relatively cool, which leads to better efficiency.

The second cooling circuit 23 and the oil circuit 26 are formed by internal channels, without there being external pipes.

The oil pump 27 can be affixed both internally and externally, but preferably without external pipes connected to the oil circuit 26.

An oil filter can also be provided that is preferably mounted on the housing 20 of the compressor module 1 without pipes. Preferably the oil filter is incorporated in the oil circuit 26 after the oil pump 27 and before the oil is distributed for the lubrication of bearings and/or gears.

The oil that is driven via the oil circuit 23 to the bearings 9 and to the gearbox 6 not only ensures adequate lubrication but also ensures cooling of the bearings 9 and the gears 7. The oil thereby absorbs heat from the bearings 9 and from the gearbox 6 and then flows back to the oil sump 8 where the oil is collected and cooled by the contact with the sump section 16a of the first cooling circuit 17, which as a result also plays a role as an oil cooler 29 for the oil in the oil sump 8, in addition to its role in the gas cooler 10.

In this way, the coolant that is guided through the first cooling circuit 17 not only absorbs heat from the compressed gas to be cooled originating from the compressor element 2, but also absorbs heat from the oil in the oil sump 8 after it has circulated in the compressor module 1 and has absorbed heat there. In this way the temperature of the coolant in the sump section 10a of the cooler 10 also rises considerably and then mixes with the coolant originating from the second cooling circuit 23 at the intermediary point 25, after which the coolant undergoes an extra temperature increase due to the heat-exchanging contact with the uncooled hot compressed gas originating directly from the compressor element 2.

In this way, a compressor module 1 according to the invention enables a coolant to be obtained at the output 19 of the first cooling circuit 17 with a high temperature that can be used for all kinds of useful applications such as heating or similar, or as hot water if water is used as a coolant for energy recovery.

It is clear from the foregoing that the gas cooler 10, the first and second cooling circuit 17, 23, as well as the oil circuit 26, with the possible exception of the oil pump 27 and the oil filter, are fully integrated in the housing 20 of the compressor module 1 via internal channels, and this without using any external pipes.

FIG. 2 shows a compressor 30 with one single compressor module 1 according to the invention that is built into a casing 31 without ventilation by outside air, and which is provided with an inlet filter 32 with an inlet 33 in the casing to the input 3 of the compressor element 2, with a pipe 11 that connects the output 4 of the compressor element 2 to the gas inlet 14 of the gas cooler 10 and whereby a pressure vessel 34 is possibly connected to an outlet 35, at the gas output 15 of the gas cooler 10, to which a network of consumers of compressed and cooled gas can be connected.

The casing 31 is thus completely closed and soundproof, save for a few passages for the inlet 33 for the gas to be compressed and an outlet 35 for the compressed gas and for the supply 36 and outlet 37 of the coolant, as well as for electric cables, not shown in the drawings, for the power supply of the motor 5, the motor 5 drive and similar.

The gas that flows through the casing 31 is thus only the gas that is compressed by the compressor 30.

The use of a compressor module 1 according to the invention adequately follows from the above description.

When the compressor element 2 is driven by the motor 5 gas is drawn in and compressed, whereby the temperature of the gas can increase sharply due to compression. The compressed gas is guided through the primary section 13 of the gas cooler 10 where it is cooled by the heat-exchanging contact with the coolant that flows through the first cooling circuit 17 in the secondary section 16 of the gas cooler 10.

The second cooling circuit 23 guides the coolant through the motor cooler 21 of the motor 5 and through the compressor element cooler 22 of the compressor element 2, where this cooling circuit 23 ensures the cooling of the motor 5 and of the compressor element 2 that will remain relatively cool as a result.

The heat that the coolant thereby absorbs from the motor 5 and from the compressor element 2 ensures supplementary heating of the coolant in the sump section 16a of the secondary section 16 of the gas cooler 10, such that the temperature of this coolant increases substantially at the combined output 19 of the first and second cooling circuit 17, 23 to a value that enables the absorbed heat of the coolant to be usefully employed.

Simultaneously, the oil pump 27 is driven that drives oil from the oil sump 8 through the bearings 9 and across the gears 7, where this oil absorbs the heat generated in the bearings 9 and gears 7 that are thereby kept cool by the oil that was first cooled by the heat-exchanging contact of the oil with the coolant in the oil sump 8 and in the motor 5 and the compressor element 2.

In this way the compressor module 1 is kept cool without any form of ventilation, while simultaneously a maximum of heat is absorbed by the coolant, heat can that can be usefully employed for heating or similar.

Figure 3:
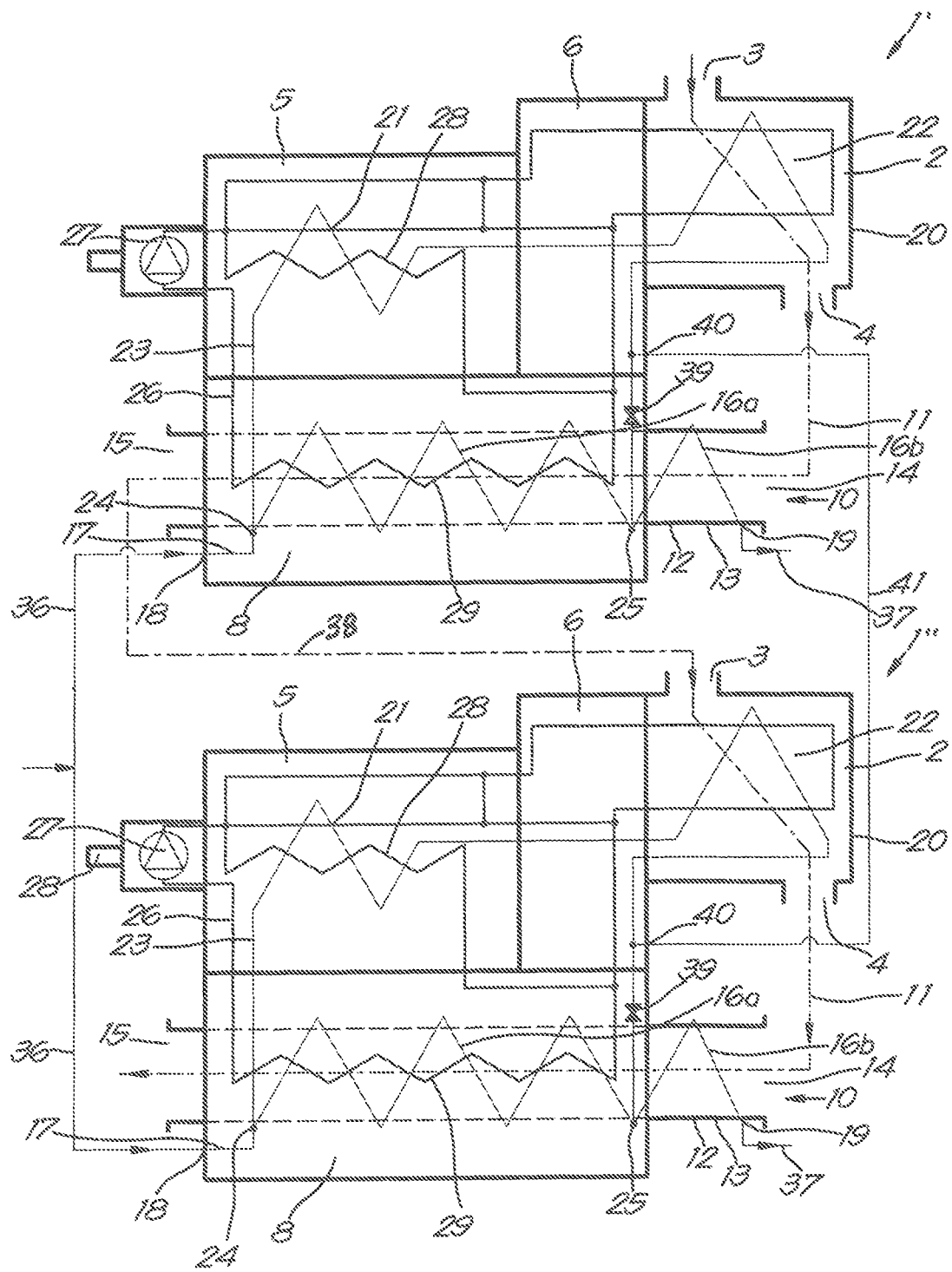
FIGS. 3 and 4 show a diagram such as that of FIGS. 1 and 2 respectively, but for a two stage compressor.

Analogous to FIG. 1, FIG. 3 schematically shows a composition of two compressor modules 1 according to the invention, respectively a low pressure compressor module 1' and a high pressure compressor module 1" that connects in series via a pressure pipe 38 at its input 3 to the gas outlet 15 of the low pressure compressor module 1'.

Figure 4:
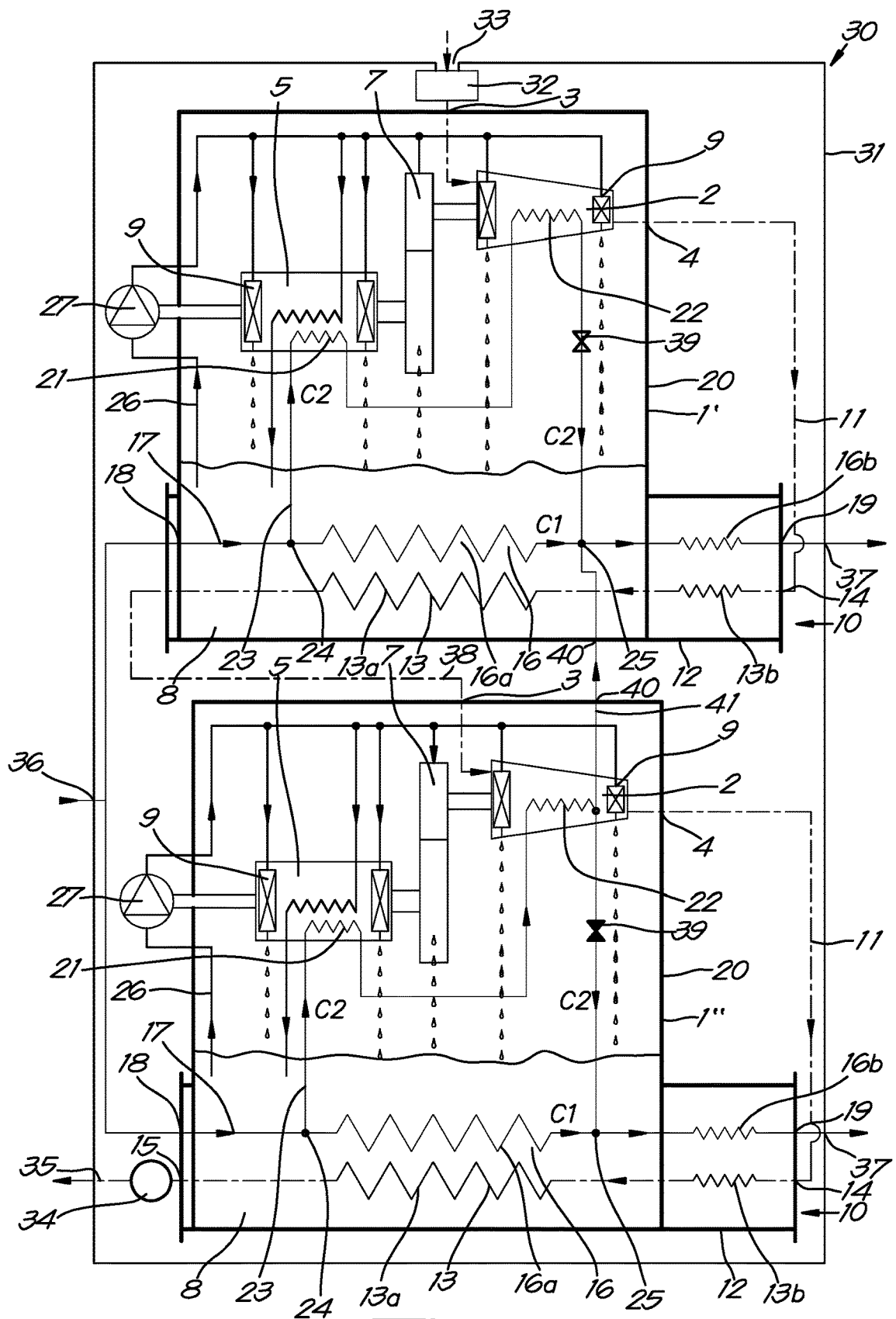

FIG. 4 shows these two compressor modules 1' and 1" built into a casing 31 of a two stage compressor 30.

The casing is provided with two passages, respectively for the inlet 33 of the gas to be compressed that is drawn in by the low pressure compressor module 1' and for the outlet of the compressed gas originating from the high pressure compressor module 1".

For the cooling a supply 36 for coolant is provided in the casing that is divided over the two compressor modules 1' and 1" and two outlets, respectively an outlet 37 for the coolant originating from the low pressure compressor module 1' and an outlet 37 for the coolant originating from the high pressure compressor module 1". Both outlets 37 can also converge before leaving the casing 31.

In this case the two compressor modules 1' and 1" are provided with a control valve 39 at the location of the connection of the second cooling circuit 23 to the first cooling circuit 17 and of a connection 40 for connecting to a cooling circuit of another compressor module.

The control valve 39 of the low pressure compressor module 1' is open, while it is closed in the high pressure compressor module 1" and the two connections 40 are connected together by means of a pipe 41.

In this way the coolant of the second cooling circuit 23 of the high pressure compressor module 1" meets the coolant of the second cooling circuit 23 of the low pressure compressor module 1' that converge with the coolant of the first cooling circuit 17 of the low pressure compressor module 1' at the intermediary point 25 of the low pressure compressor module 1', such that the temperature of the coolant at the outlet 37 of the low pressure compressor module 1' increases further with respect to the arrangement of FIGS. 1 and 2.

The gas cooler 10 of the low pressure compressor module 1' is used in this configuration as an intercooler for the compressed gas from the low pressure compressor module 1' before it is compressed by the high pressure compressor module 1".

The gas cooler 10 of the high pressure compressor module 1" is then used as an aftercooler for the compressed gas of the high pressure compressor module 1" before it is supplied to the network, and is only cooled by a part of the coolant that is not guided to the low pressure compressor module 1' via the second cooling circuit 23 of the high pressure compressor module 1", whereby this part of the coolant that flows through the gas cooler 10 is also removed via the outlet 37.

With such a compressor 30 a gas can be compressed very efficiently without ventilation and with two flow rates of a coolant that can be usefully used to be able to recover energy from the heat that is generated by compression, in the bearings and gears and similar.

Figure 5:
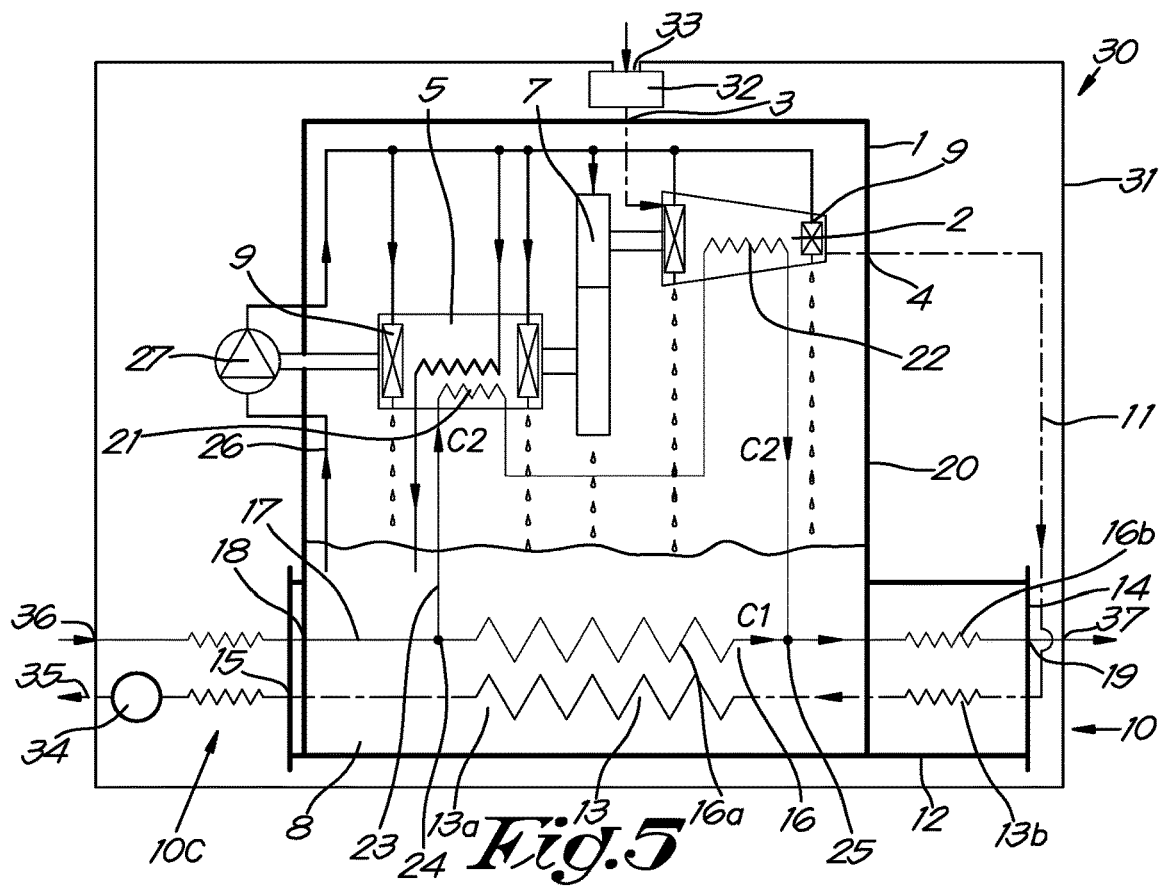
FIGS. 5 to 8 show different variants of the compressor module of FIG. 1.

FIG. 5 shows a variant of a compressor 30 whereby an extra aftercooler 10c, that can be both external and internal, is provided downstream from the gas cooler 10 of the compressor module 1 and in series with it.

Figure 6:
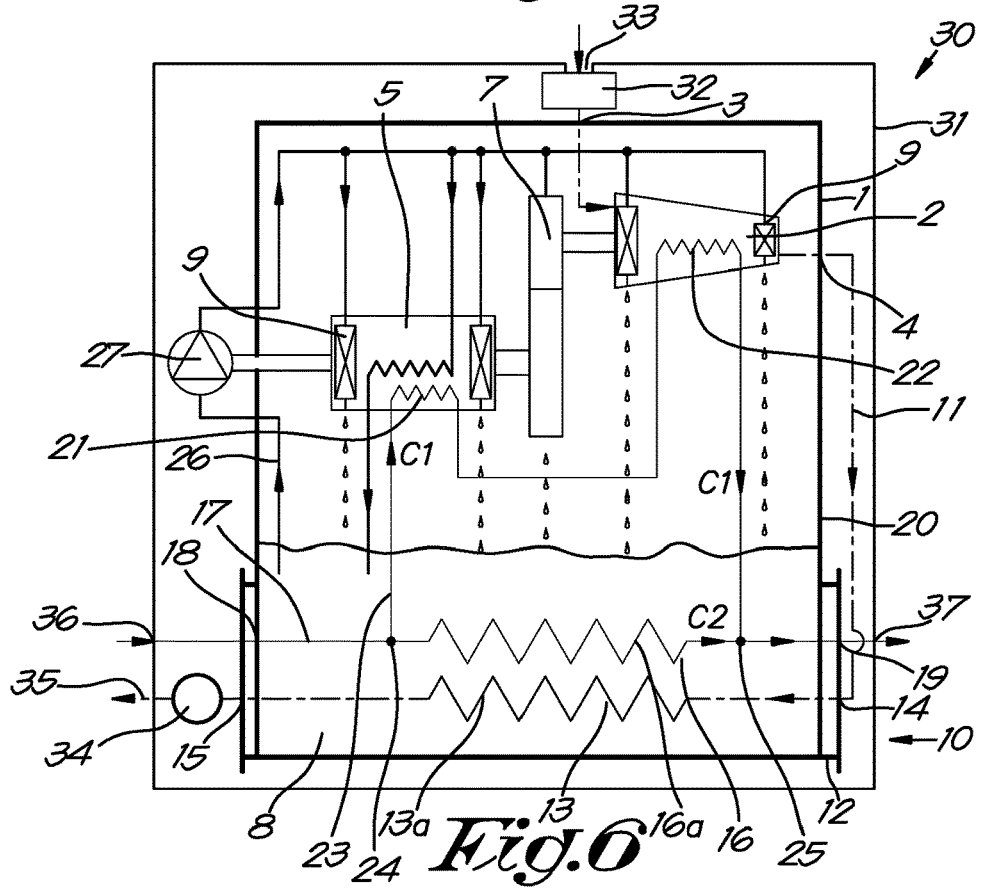

FIG. 6 shows another variant of a compressor 30 according to the invention, whereby in this case the gas cooler 10 extends through the oil sump 8 over its entire length, so that the gas cooler 10 then only contains a sump section 10a without outer section 10b. This missing outer section and can replaced if necessary by an extra external cooler (not shown).

In the example of FIGS. 1 to 6, the entire sump section 10a of the gas cooler 10 is bypassed each time by the second cooling circuit 23, although it is possible according to a variant that only a section of the sump section 10a is bypassed.

Figure 7:
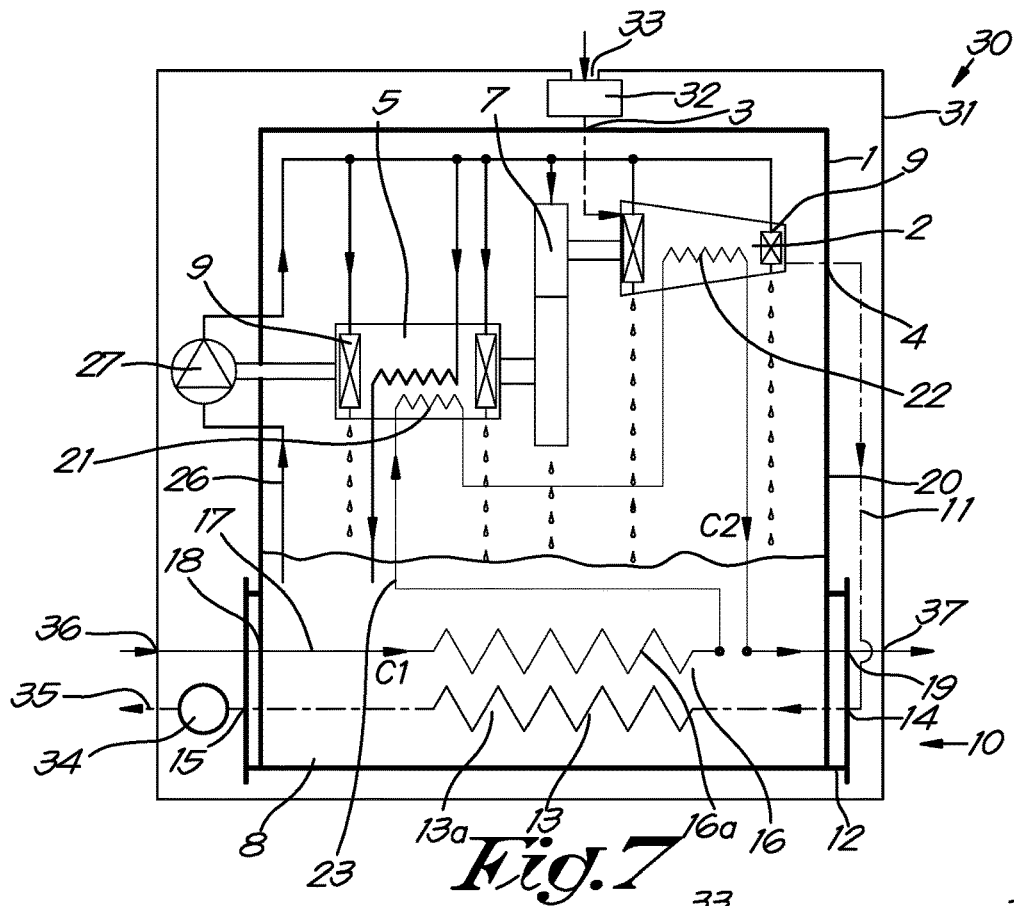

FIG. 7 shows a variant whereby in this case the first cooling circuit 17 and the second cooling circuit 23 are connected together in series with an input 18 and an output 19 to successively guide the coolant through both cooling circuits, for example first through the first cooling circuit 17 and then through the second cooling circuit 23 or in the reverse order.

Figure 8:
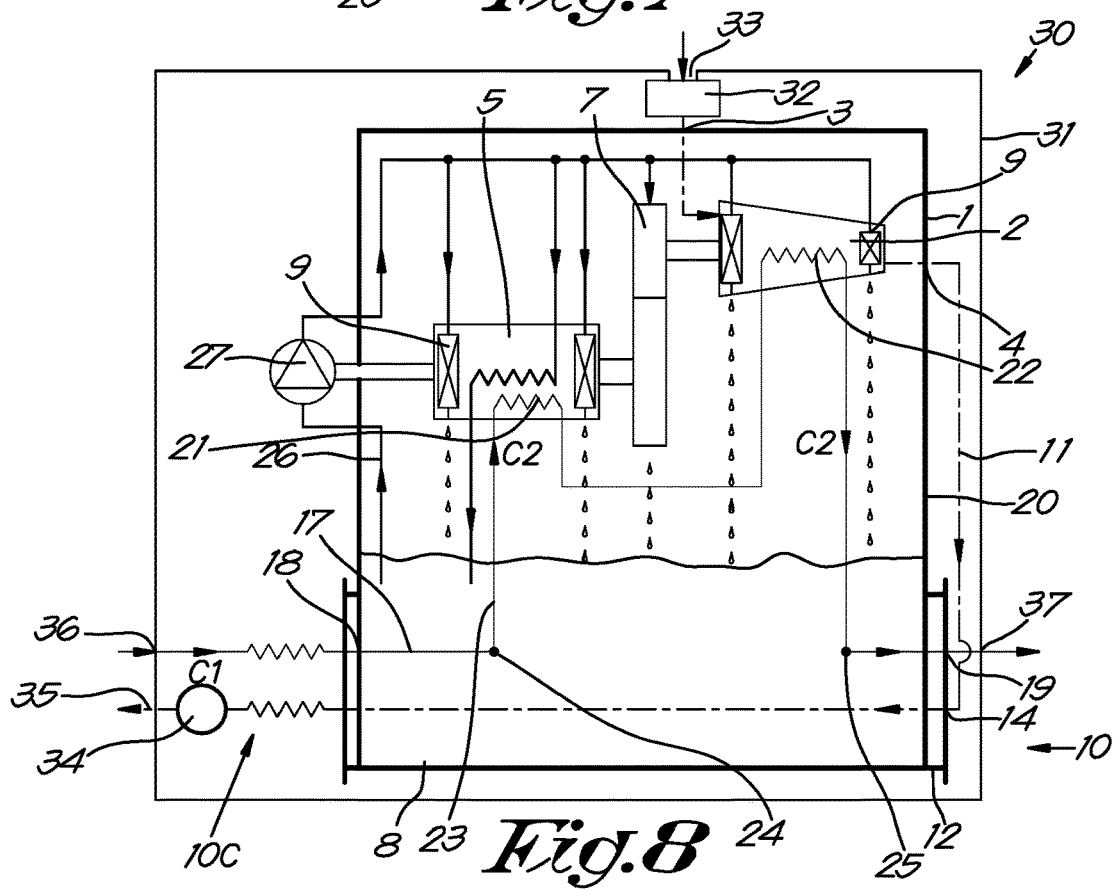

FIG. 8 shows another possible variant of a compressor 30 according to the invention, whereby in this case the gas cooler 10 is constructed completely externally without a sump section 10a.

Although there is a gearbox 6 in all variants described above, it is not excluded that the motor 5 drives the compressor element 2 directly, without a gearbox, for example in the case of an electric motor with a variable speed.

The present invention is by no means limited to the embodiments described as an example and shown in the drawings, but a compressor module according to the invention and a compressor equipped therewith can be realised in all kinds of forms and dimensions without departing from the scope of the invention.

The invention claimed is:

1. A compressor module for compressing gas comprising:
   a compressor element with a housing with an integrated compressor element cooler;
   a motor; and
   a gas cooler for cooling the compressed gas originating from the compressor element,
   wherein the gas cooler comprises a primary section through which the gas to be cooled is able be guided and a secondary section that is in heat-exchanging contact with the primary section; and
   wherein a first cooling circuit is configured to guide a coolant through the secondary section of the gas cooler or through a section thereof and a second cooling circuit is configured to guide the coolant through the compressor element cooler;
   wherein the first cooling circuit and the second cooling circuit are joined together in series or in parallel and are guided to a common output; and
   wherein the compressor module comprises a closed oil circuit with an oil sump and an oil pump in order to drive the oil out of the oil sump through or along hot parts of the compressor module via internal channels, and
   wherein the gas cooler extends through at least a part of the oil sump of the compressor module.

2. The compressor module according to claim 1, wherein the compressor module comprises a gearbox with a housing between the compressor element and the motor.

3. The compressor module according to claim 1, wherein the motor comprises a housing with an integrated motor cooler.

4. The compressor module according to claim 3, wherein the second cooling circuit is able guide coolant through the motor cooler in series or in parallel to the compressor element.

5. The compressor module according to claim 1, wherein the oil in the oil circuit is in heat-exchanging contact with the first cooling circuit and/or with the second cooling circuit via aforementioned internal channels and/or the oil sump.

6. The compressor module according to claim 5, wherein the oil pump is driven by the motor that drives the compressor element or by a separate motor.

7. The compressor module according to claim 5, wherein the oil in the oil circuit is in heat-exchanging contact with the second cooling circuit via internal channels of the motor and/or of the compressor element that are in heat-exchanging contact with a motor cooler and/or with the compressor element cooler.

8. The compressor module according to claim 5, wherein the oil in the oil circuit is in heat-exchanging contact with the first cooling circuit via the secondary section of the gas cooler or a section thereof that is in heat-exchanging contact with the oil in the oil sump.

9. The compressor module according to claim 1, wherein the primary section of the gas cooler is formed by a tube, whereby the secondary section of the gas cooler is integrated in or around this tube.

10. The compressor module according to claim 1, wherein the second cooling circuit is connected in parallel to the first cooling circuit or to a section of this first cooling circuit, whereby the second cooling circuit entirely or partially bypasses the first cooling circuit.

11. The compressor module according to claim 10, wherein the first cooling circuit is provided with an input for the supply of the coolant and that the second cooling circuit is tapped off from the first cooling circuit at this input or at a point upstream from the secondary section of the gas cooler between this input and the secondary section of the gas cooler.

12. The compressor module according to claim 11, wherein the second cooling circuit connects to the first cooling circuit at an intermediary point of the secondary section of the gas cooler between the input and output of this secondary section.

13. The compressor module according to claim 12, wherein the second cooling circuit is connected to the first cooling circuit to bypass the secondary section in the sump section of the gas cooler.

14. The compressor module according to claim 12, wherein a control valve and a closable connection for coolant are provided at the location of the connection of the second cooling circuit at the aforementioned intermediary point of the secondary section of the gas cooler.

15. The compressor module according to claim 1, wherein the first cooling circuit and the second cooling circuit are connected together in series with an input and an output to guide the coolant successively through both cooling circuits.

16. The compressor module according to claim 1, wherein the pipes of the second cooling circuit and the oil circuit are integrated in the housing of the compressor module.

17. The compressor module according to claim 1, wherein pipes of the first cooling circuit are integrated in the housing of the compressor module.

18. The compressor module according claim 1, wherein at the output, the coolant reaches a temperature higher than 65° C.

19. The compressor comprising at least one compressor module according to claim 1, wherein it is affixed in a closed casing without forced ventilation with gas from the outside.

20. The compressor according to claim 19, wherein the casing only has an inlet and an outlet for gas that is compressed by the compressor element and a supply and outlet for the coolant that is driven through the cooling circuits.

21. The compressor according to claim 19, wherein it is an oil-free screw compressor.

22. The compressor according to claim 19, wherein it comprises at least two of the aforementioned compressor modules, respectively at least a low pressure compressor module, and at least a high pressure compressor module whose input of the compressor element connects to the gas outlet of the low pressure compressor module, whereby the low pressure compressor module is a compressor module of which the second cooling circuit connects to the first cooling circuit at an intermediary point of the secondary section of the gas cooler between the input and output of this secondary section, and whereby the second cooling circuit of the high pressure compressor module connects to the first cooling circuit of the low pressure compressor module at the location of the aforementioned intermediary point.

23. The compressor module according claim 1, wherein at the output, the coolant reaches a temperature higher than 75° C.

24. The compressor module according to claim 1, wherein at the output, the coolant reaches a temperature higher than 85° C.

25. A compressor module for compressing gas comprising:
   a compressor element with a housing with an integrated compressor element cooler:
   a motor; and
   a gas cooler for cooling the compressed gas originating from the compressor element,
   wherein the gas cooler comprises a primary section through which the gas to be cooled is able be guided and a secondary section that is in heat-exchanging contact with the primary section,
   wherein a first cooling circuit is configured to guide a coolant through the secondary section of the gas cooler or through a section thereof and a second cooling circuit is configured to guide the coolant through the compressor element cooler,
   wherein the first cooling circuit and the second cooling circuit are joined together in series or in parallel and are guided to a common output, and
   wherein the second cooling circuit is able guide coolant through a cooler on the motor drive in series or in parallel to the compressor element.

26. A compressor module for compressing gas comprising:
   a compressor element with a housing with an integrated compressor element cooler:
   a motor; and
   a gas cooler for cooling the compressed gas originating from the compressor element,
   wherein the gas cooler comprises a primary section through which the gas to be cooled is able be guided and a secondary section that is in heat-exchanging contact with the primary section,
   wherein a first cooling circuit is configured to guide a coolant through the secondary section of the gas cooler or through a section thereof and a second cooling circuit is configured to guide the coolant through the compressor element cooler,
   wherein the first cooling circuit and the second cooling circuit are joined together in series or in parallel and are guided to a common output,
   wherein the compressor module comprises a closed oil circuit with an oil sump and an oil pump in order to drive the oil out of the oil sump through or along hot parts of the compressor module via internal channels,
   wherein the oil in the oil circuit is in heat-exchanging contact with the first cooling circuit and/or with the second cooling circuit via aforementioned internal channels and/or the oil sump,
   wherein the oil in the oil circuit is in heat-exchanging contact with the first cooling circuit via the secondary section of the gas cooler or a section thereof that is in heat-exchanging contact with the oil in the oil sump, and wherein the gas cooler extends through the oil sump by at least a sump section, whereby the primary section and/or the secondary section of the gas cooler in this sump section of the gas cooler is in heat-exchanging contact with the oil in the oil sump.

27. The compressor module according to claim 26, wherein the gas cooler extends outside the oil sump by at least an outer section, whereby the outer section of the primary section of this outer section is provided with a gas inlet to be able to guide the gas to be cooled successively through the outer section and the sump section.

* * * * *